US008474733B1

(12) United States Patent
Clark et al.

(10) Patent No.: US 8,474,733 B1
(45) Date of Patent: Jul. 2, 2013

(54) IRRIGATION SPRINKLER WITH REVERSING PLANETARY GEAR DRIVE INCLUDING TWO RING GEARS WITH DIFFERENT PROFILES

(75) Inventors: Michael L. Clark, San Marcos, CA (US); Zachary B. Simmons, Escondido, CA (US)

(73) Assignee: Hunter Industries, Inc., San Marcos, CA (US)

(*) Notice: Subject to any disclaimer, the term of this patent is extended or adjusted under 35 U.S.C. 154(b) by 802 days.

(21) Appl. No.: 12/710,298

(22) Filed: Feb. 22, 2010

(51) Int. Cl.

| | |
|---|---|
| ***A01G 25/06*** | (2006.01) |
| ***B05B 15/10*** | (2006.01) |
| ***B05B 3/04*** | (2006.01) |
| ***B05B 3/16*** | (2006.01) |
| ***B05B 15/06*** | (2006.01) |

(52) U.S. Cl.
USPC ........... 239/242; 239/201; 239/204; 239/210; 239/237; 239/240

(58) Field of Classification Search
USPC ................. 239/201, 204, 205, 206, 210, 237, 239/240, 242
See application file for complete search history.

(56) References Cited

U.S. PATENT DOCUMENTS

| | | | | |
|---|---|---|---|---|
| 4,204,642 | A | 5/1980 | Hunter | 239/191 |
| 4,265,404 | A | 5/1981 | Hunter | 239/186 |
| 4,301,967 | A | 11/1981 | Hunter | 239/99 |
| 4,501,391 | A | 2/1985 | Hunter | 239/97 |
| 4,568,023 | A | 2/1986 | Hayes | 239/242 |
| RE32,386 | E | 3/1987 | Hunter | 239/206 |
| 4,784,329 | A | 11/1988 | Heren | 239/498 |
| 4,892,252 | A | 1/1990 | Bruninga | 239/205 |
| 5,174,501 | A | 12/1992 | Hadar | 230/242 |
| 5,330,103 | A * | 7/1994 | Eckstein | 239/242 |
| 5,511,727 | A | 4/1996 | Heren et al. | 239/242 |
| 5,645,218 | A | 7/1997 | Heren et al. | 239/242 |
| 5,662,545 | A | 9/1997 | Zimmerman et al. | 475/344 |
| 5,938,122 | A | 8/1999 | Heren et al. | 239/242 |
| 6,042,021 | A | 3/2000 | Clark | 239/205 |
| 6,123,271 | A * | 9/2000 | Delaney et al. | 239/227 |
| 6,491,235 | B1 * | 12/2002 | Scott et al. | 239/206 |
| 6,604,697 | B1 | 8/2003 | Heren et al. | 239/723 |
| 6,732,950 | B2 * | 5/2004 | Ingham et al. | 239/205 |
| 7,017,831 | B2 | 3/2006 | Santiago et al. | 239/206 |
| 7,028,920 | B2 | 4/2006 | Hekman et al. | 239/240 |
| 7,677,469 | B1 * | 3/2010 | Clark | 239/242 |
| 2006/0049275 | A1 | 3/2006 | Santiago et al. | 239/240 |

OTHER PUBLICATIONS

Rain Bird 7005 Full/Part-Circle Rotor Pop-Up Sprinkler—Rain Bird 2005-2006 Catalog, p. 88.

(Continued)

*Primary Examiner* — Ryan Reis
(74) *Attorney, Agent, or Firm* — Knobbe, Martens, Olson & Bear LLP

(57) ABSTRACT

A sprinkler includes a turbine, a nozzle, and a reversing planetary gear drive. The reversing planetary gear drive rotatably couples the turbine and the nozzle through an additional reversing mechanism external to the planetary gear drive. The planetary gear drive includes a shift sun gear capable of axially shifting between raised and lowered positions to alternately drive a non-axially shifting first planet gear that in turn drives a first ring gear and a non-axially shifting second planet gear that in turn drives a second ring gear through an idler gear, the first and second ring gears having different gear tooth profiles to thereby change a direction of rotation of the planetary gear drive and rotate the nozzle in clockwise and counter-clockwise directions at a substantially uniform predetermined speed of rotation.

20 Claims, 6 Drawing Sheets

OTHER PUBLICATIONS

Toro 2001 Series Commercial including Data & Performance Charts, pp. 58-59.

Nelson Pro 7000, 7500 & Nelson Pro 5500, 6000, 6500 Data Sheets, pp. 36-37.

* cited by examiner

IRRIGATION SPRINKLER WITH REVERSING PLANETARY GEAR DRIVE INCLUDING TWO RING GEARS WITH DIFFERENT PROFILES

FIELD OF THE INVENTION

The present invention relates apparatus for irrigating turf and landscaping, and more particularly, to rotor-type sprinklers having a turbine that rotates a nozzle through a gear train reduction.

BACKGROUND OF THE INVENTION

In many parts of the United States, rainfall is insufficient and/or too irregular to keep turf and landscaping green and therefore irrigation systems are installed. Such systems typically include a plurality of underground pipes connected to sprinklers and valves, the latter being controlled by an electronic irrigation controller. One of the most popular types of sprinklers is a pop-up rotor-type sprinkler. In this type of sprinkler a tubular riser is normally retracted into an outer cylindrical case by a coil spring. The case is buried in the ground and when pressurized water is fed to the sprinkler the riser extends. A turbine and a gear train reduction are mounted in the riser for rotating a nozzle turret at the top of the riser. The gear train reduction is often encased in its own housing and is often referred to as a "gear box." A reversing mechanism is also normally mounted in the riser along with an arc adjustment mechanism.

The gear box of a rotor-type sprinkler can include a series of staggered gears and shafts wherein a small gear on the top of the turbine shaft drives a large gear on the lower end of an adjacent second shaft. Another small gear on the top of the second shaft drives a large gear on the lower end of a third shaft, and so on. Alternately, the gear box can comprise a planetary arrangement in which a central shaft carries a sun gear that simultaneously drives several planetary gears on rotating circular partitions or stages that transmit reduced speed rotary motion to a succession of similar rotating stages. It is common for the planetary gears of the stages to engage corresponding ring gears formed on the inner surface of the gear box housing. See, for example, U.S. Pat. No. 5,662,545 granted to Zimmerman et al.

Two basic types of reversing mechanisms have been employed in commercial rotor-type sprinklers. In one design a reversing stator switches water jets that alternately drive the turbine from opposite sides to reverse the rotation of the turbine and the gear box. See for example, U.S. Pat. No. 4,625,914 granted to Sexton et al. The reversing stator design typically employs a long metal shaft that can twist relative to components rigidly mounted on the shaft and undesirably change the reverse point. Stopping the rotation of the stator and changing direction of rotation via alternate water jets does not provide for good repeatable arc shift points. Users setting the arc of sprinklers that employ a reversing stator design do not get a tactile feel for a stop at the set reverse points.

A more popular design for the reversing mechanism of a rotor-type sprinkler includes four pinion gears meshed together and mounted between arc-shaped upper and lower frames that rock back and forth with the aid of Omega-shaped over-center springs. One of the inner pinion gears is driven by the gear box and the pinion gears on opposite ends of the frames alternately engage a bull gear assembly. See for example, U.S. Pat. Nos. 3,107,056; 4,568,024; 4,624,412; 4,718,605; and 4,948,052, all granted to Edwin J. Hunter, the founder of Hunter Industries, Inc., the assignee of the subject application. The entire disclosures of said patents are hereby incorporated by reference. While the reversing frame design has been enormously successful, it is not without its own shortcomings. It involves a complicated assembly with many parts and can have operational failures. The main drawback of the reversing frame design is that the pinion gears are held in contact to the outer bull gear with a spring force that is relatively weak. Therefore, it is not uncommon for the pinion gears to break, wear out, or become stripped during operation of this kind of rotor-type sprinkler.

Non-reversing, full circle rotation sprinklers such as golf rotors and stream sprinklers have been commercialized that have incorporated planetary gear boxes. Rotor-type sprinklers have also been commercialized that have combined planetary gear boxes and reversing mechanisms, however, in all such sprinklers all parts of the reversing mechanisms have been external to the gear box. See for example, U.S. Pat. No. 4,892,252 granted to Bruniga.

SUMMARY OF THE INVENTION

In accordance with the present invention, a sprinkler includes a turbine, a nozzle, and a reversing planetary gear drive. The reversing planetary gear drive rotatably couples the turbine and the nozzle through an additional reversing mechanism external to the planetary gear drive. The planetary gear drive includes a shift sun gear capable of axially shifting between raised and lowered positions to alternately drive a non-axially shifting first planet gear that in turn drives a first ring gear and a non-axially shifting second planet gear that in turn drives a second ring gear through an idler gear, the first and second ring gears having different gear tooth profiles to thereby change a direction of rotation of the planetary gear drive and rotate the nozzle in clockwise and counter-clockwise directions at a substantially uniform predetermined speed of rotation.

DETAILED DESCRIPTION

The entire disclosure of U.S. patent application Ser. No. 11/761,911 filed Jun. 12, 2007 naming Michael L. Clark as the sole inventor and entitled SPRINKLER WITH REVERSING PLANETARY GEAR DRIVE is hereby incorporated by reference. That application is assigned to Hunter Industries, Inc., the assignee of the present application, and was allowed in a Notice of Allowance mailed Nov. 23, 2009.

Figure 1:
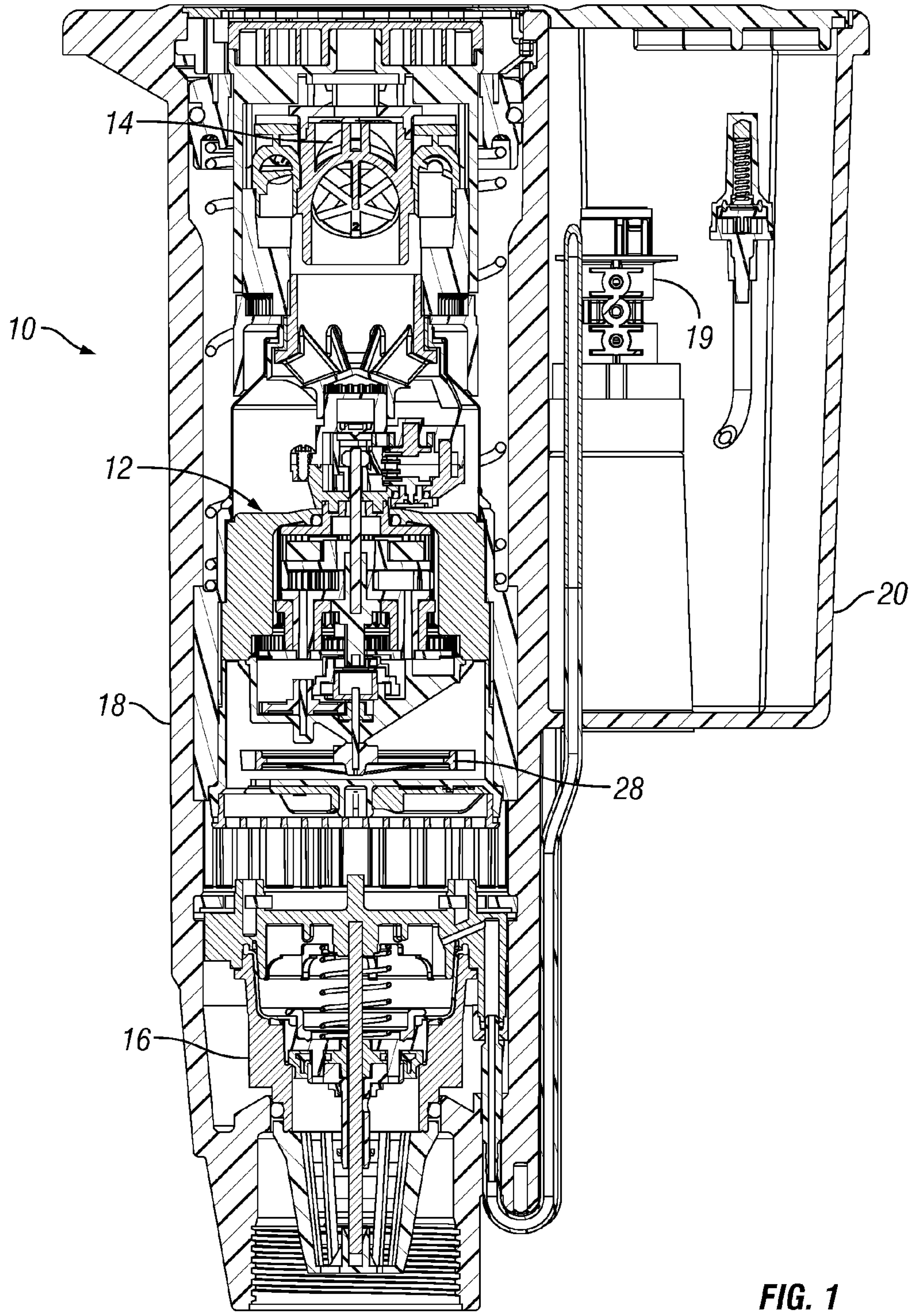
FIG. 1 is a vertical sectional view of a rotor-type sprinkler incorporating an embodiment of the present invention.
Figure 2:
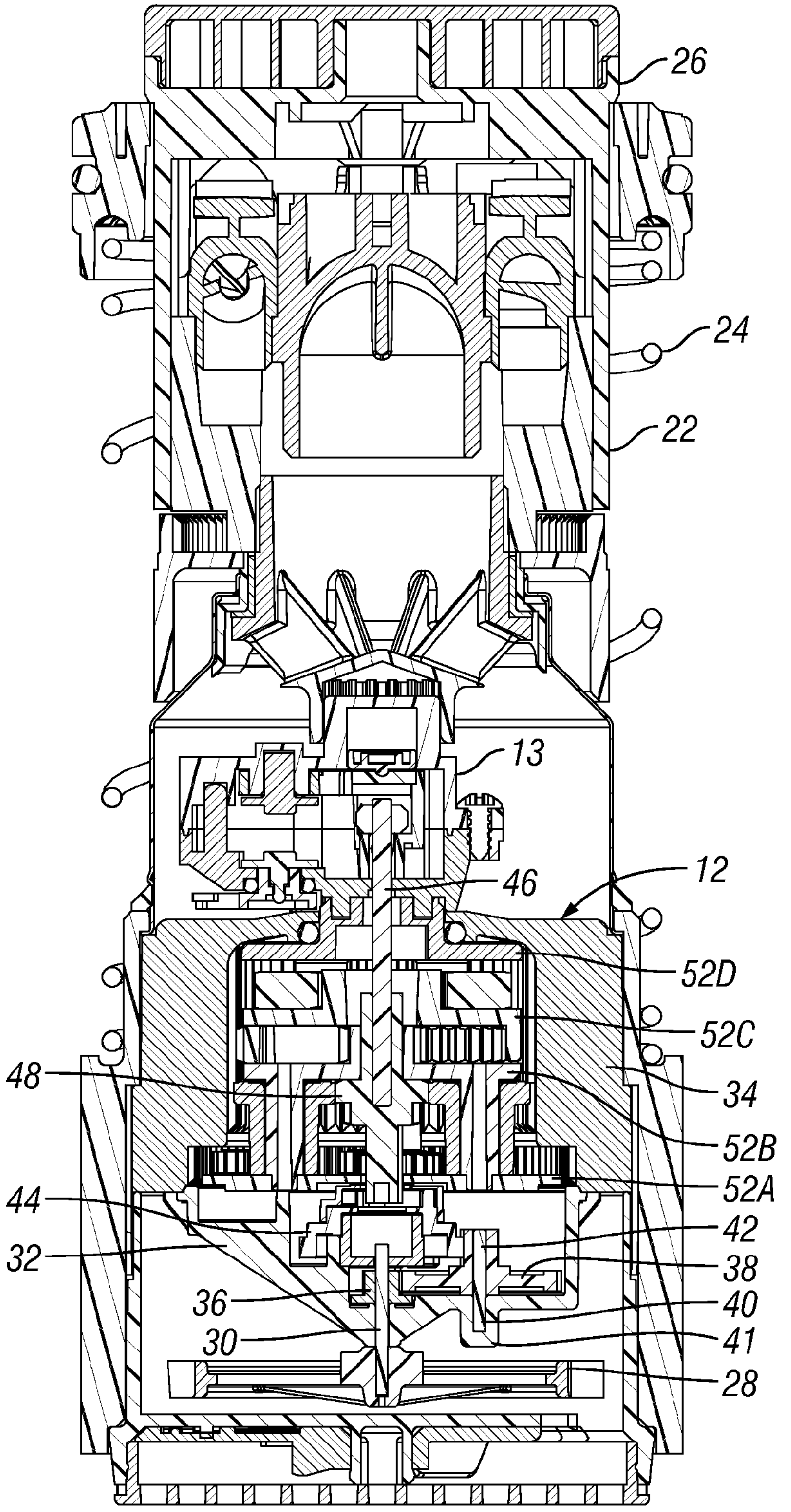
FIG. 2 is an enlarge view of the riser and nozzle turret of the sprinkler of FIG. 1.

Referring to FIG. 1, in accordance with an embodiment of the present invention a rotor-type sprinkler 10 incorporates a reversing planetary gear drive 12 (FIG. 2) that rotates or oscillates a nozzle 14 between pre-set arc limits. Except for the reversing planetary gear drive 12, and an additional reversing mechanism 13 located externally of the reversing planetary gear drive 12, the sprinkler 10 generally has a construction similar to that disclosed in U.S. Pat. No. 6,491,235 of Scott et al. granted Dec. 10, 2002, assigned to Hunter Industries, Inc., the entire disclosure of which is hereby incorporated by reference. Except for the springs, the other components of the sprinkler 10 are generally made of injection molded plastic. The sprinkler 10 is a so-called valve-in-head sprinkler that incorporates a valve 16 in the bottom of a cylindrical outer case 18 which is opened and closed by valve actuator components 19 contained in a housing 20 on the side of the case 18. The sprinkler 10 includes a generally tubular riser 22 (FIG. 2). A coil spring 24 normally holds the riser 22 in a retracted position within the outer case 18. The nozzle 14 is carried inside a cylindrical nozzle turret 26 rotatably mounted to the upper end of the riser 22. The coil spring 24 is compressible to allow the riser 22 and nozzle turret 26 to telescope from their retracted positions to their extended positions when pressurized water is introduced into the female threaded inlet at the lower end of the outer case 18.

FIG. 2 illustrates further details of the riser 22, nozzle turret 26 and reversing planetary gear drive 12. A turbine 28 is rigidly secured to the lower end of a vertically oriented drive input pinion shaft 30. The pinion shaft 30 extends through the lower cap 32 of a cylindrical gear box housing 34 of the reversing planetary gear drive 12. A turbine pinion gear 36 is rigidly secured to the upper end of the pinion shaft 30. The turbine pinion gear 36 drives a lower spur gear 38 secured to a spur gear shaft 40 the lower end of which is journaled in a sleeve 41 integrally formed in the lower cap 32. Another pinion gear 42 is integrally formed on top of the spur gear 38 and drives an upper spur gear 44 of the reversing planetary gear drive 12.

Figure 3:
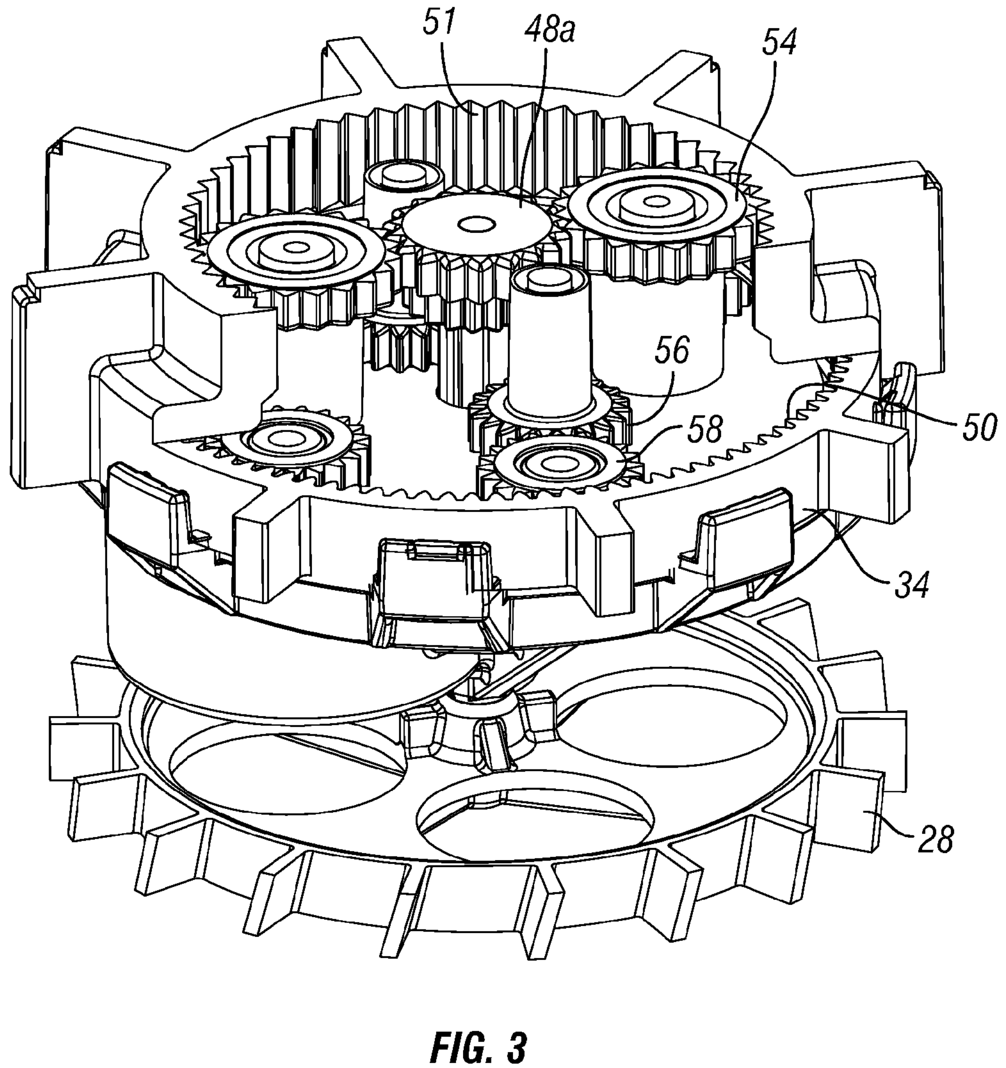
FIG. 3 is a still further enlarged fragmentary isometric view of the turbine and a portion of the planetary gear drive of the sprinkler of FIG. 1. In this view the bi-level shift sun gear is in its raised state.
Figure 4:
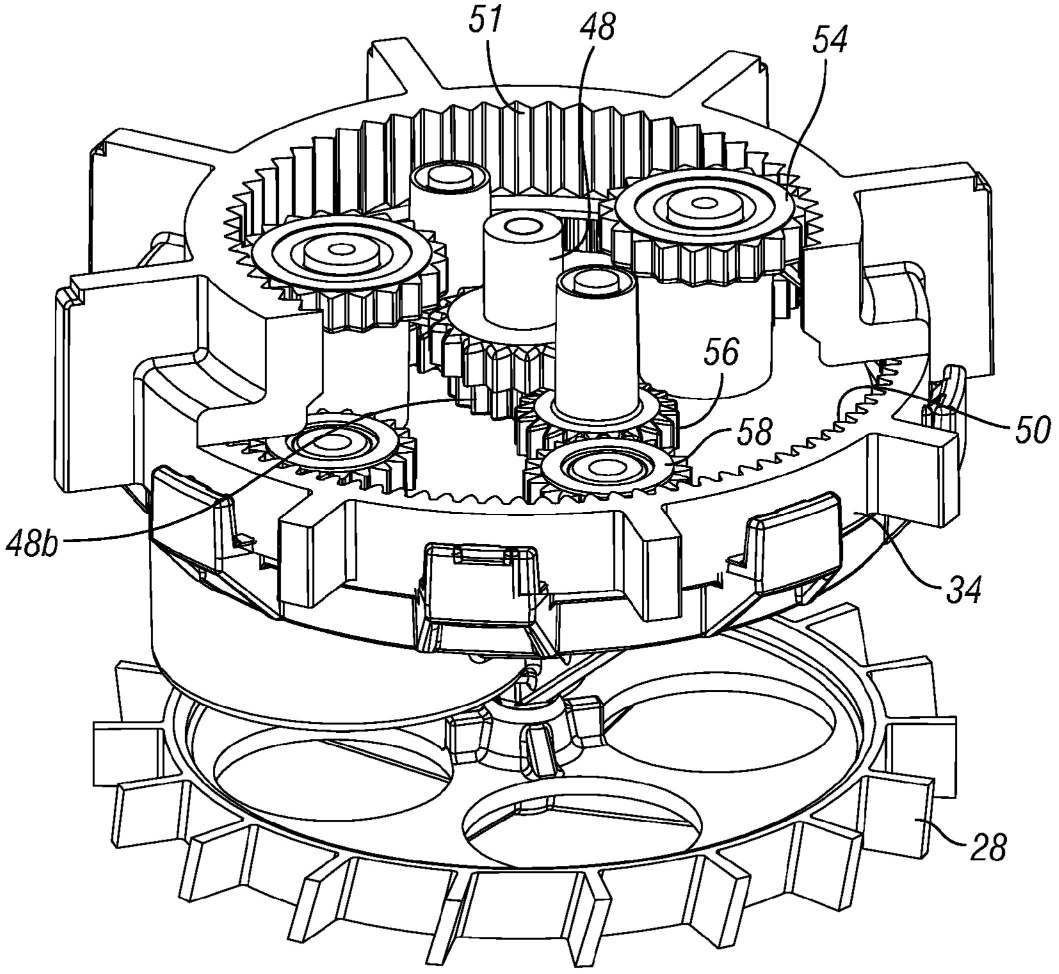
FIG. 4 is a view similar to FIG. 3 except that the bi-level shift sun gear is in its lowered state.
Figure 5:
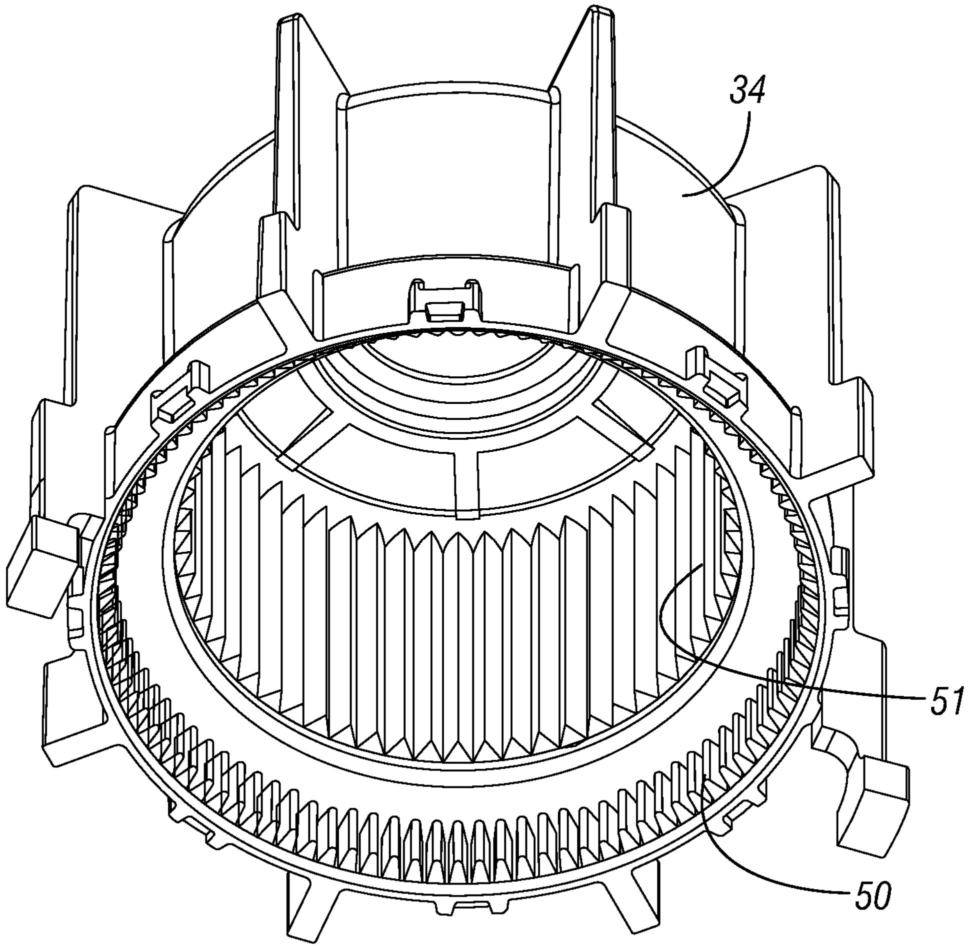
FIG. 5 is an isometric view of the gear box housing of the sprinkler of FIG. 1 illustrating the two ring gears integrally formed on the interior wall thereof.

Referring still to FIG. 2, the reversing planetary gear drive 12 has a centrally located main drive shaft 46. The lower end of the drive shaft 46 is rigidly and co-axially coupled to a bi-level shift sun gear 48 which is vertically reciprocated by axial movement of the drive shaft 46 between a raised state (FIG. 3) and a lowered state (FIG. 4). The interior wall of the cylindrical gear box housing 34 is formed with two ring gears 50 and 51 (FIG. 5). Each of the ring gears 50 and 51 comprises a plurality of circumferentially spaced, vertically extending, radially inwardly projecting teeth that are engaged by the various planet gears of the reversing planetary gear drive 12. The lower ring gear 50 has a larger diameter and more teeth than the upper ring gear 51. The upper ring gear 51 has a larger axial length than the lower ring gear 50. Together the ring gears 50 and 51 form a bi-level ring gear.

Figure 6:
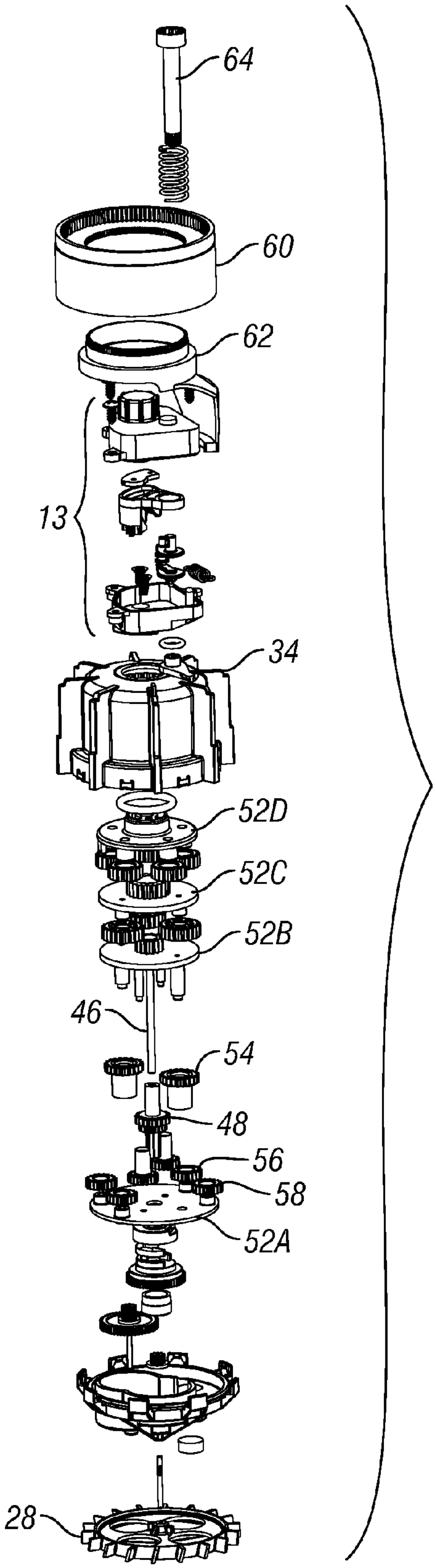
FIG. 6 is an exploded view of the reversing planetary gear drive and additional reversing mechanism of the sprinkler of FIG. 1.

Referring to FIGS. 2 and 6, the reversing planetary gear drive 12 includes a first stage carrier 52A, second stage carrier 52B, a third stage carrier 52B, and a fourth output stage carrier 52D all of which rotate around the drive shaft 46. A central spline opening (not illustrated) in the upper spur gear 44 is drivingly coupled to a spline-shaped extension of the bi-level shift sun gear 48 to allow for axial movement of the bi-level shift gear 48 relative to the upper spur gear 44. Thus the upper spur gear 44 continuously rotates the bi-level shift sun gear 48 and the drive shaft 46 during vertical axial reciprocating movement of the bi-level shift sun gear 48.

When the bi-level shift sun gear 48 is in its raised state (FIG. 3) the larger diameter upper stage **48*a* thereof engages and meshes with a complementary planet gear 54. When the bi-level shift sun gear 48 is in its lowered state (FIG. 4) the smaller diameter lower stage 48*b* thereof engages and meshes with a complementary idler gear 56. The different gear profiles of the upper and lower stages 48*a* and 48*b* of the bi-level shift sun gear 48 are important in matching the rotational speed of the nozzle 14 in both the clockwise and counter-clockwise directions. The planet gear 54 directly meshes with the upper ring gear 51 formed on the interior wall of the gear box housing 34. The idler gear 56 engages a planet gear 58 which in turn engages the lower ring gear 50. Thus the direction of rotation subsequently carried through the remaining stages of the reversing planetary gear drive 12 is reversed by up and down movement of the drive shaft 46 and the bi-level shift sun gear 48 carried therewith. The level of rotational torque on the planet gears 54 and 58 is very low since they rotate at relatively high RPM. The meshing of the bi-level shift sun gear 48 with the planet gear 54 and idler gear 56 is very smooth. The smooth shifting transition is largely influenced by its vertical position in the planetary gear drive 12. The rotational speed of the turbine 28 is very high. If the shift sun gear 48 is placed too close to the turbine 28, the rotational speed of the bi-level shift sun gear 48 will be too fast, and shifting direction will be difficult as the gear teeth will tend to skip past each other instead of meshing smoothly. Likewise, the final output stage of the reversing planetary gear drive 12 generates substantial rotational torque. If the shift sun gear 48 is placed too close to the output stage, the excessive torque will make it difficult for the teeth of the shift sun gear 48 to slip axially across the faces of the planet gear 54 and idler gear 56 and shifting will be difficult. Of course the pitch of the gears on the upper and lower stages 48*a* and 48*b* of the bi-level shift sun gear 48, the idler gear 56 and the planet gears 54 and 58 must match that of the respective ring gears 50 and 51 in order that they mesh properly. However, it is not necessary that the pitch of the teeth on the upper ring gear 51 is the same as those on the lower ring gear 50 as they are completely independent drive sections of the reversing planetary gear drive 12**.

The reversing planetary gear drive 12 further includes additional sun gears and planet gears which need not be described in detail as they will be readily understood by those skilled in the art of sprinkler design based on viewing the configuration of the reversing planetary gear drive as illustrated in detail in FIG. 6. The other planet gears also engage the ring gears 50 and 51 and rotate about corresponding fixed cylindrical posts that extend axially from their associated carriers 52A, 52B, 52C and 52D. Each non-shifting sun gear is rigidly secured to, or integrally formed with, one of the carriers 52B, 52C and 52D. The uppermost carrier 52D has an upwardly projecting central section that is coupled to the underside of the reversing mechanism 13 in order to rotate the same. The reversing mechanism 13 in turn supports and rotates the nozzle turret 26. With this arrangement of gears the high RPM of the turbine 28 is successively reduced so that the final output RPM of the drive shaft 46 is relatively low, and the output torque at the central section 59 of the uppermost carrier 52D is relatively high. For example, the turbine 28 may rotate at eight hundred RPM and the output shaft 46 may rotate at an RPM of less than one.

High output torque is important for large area sprinklers. Sprinklers of this type can discharge seventy-five gallons of water per minute at one-hundred and twenty PSI to throw water one hundred and fifteen feet from the sprinkler. Discharging water at this rate creates substantial upward and radial forces on the nozzle turret 26 that results in significant drag and resistance to rotation of this key component of a rotor-type sprinkler. The gear drives utilized in this type of sprinkler must overcome that resistance.

The fast spinning turbine 28 can slowly rotate the nozzle turret 26 through the reversing planetary gear drive 12 and the additional reversing mechanism 13. The additional reversing mechanism 13 includes cams and components that lift and drop the output shaft 46. An adjustable arc mechanism including bull gear ring 60, arc tab carrier ring 62 and adjusting gear 64, cooperates with the reversing mechanism 13 to permit user adjustment of the size of the arc of oscillation of the nozzle 14. The structure of the additional reversing mechanism 13 is described in detail in the co-pending U.S. patent application entitled REVERSING MECHANISM FOR AN IRRIGATION SPRINKLER WITH A REVERSING PLANETARY GEAR DRIVE of Michael L. Clark and Zachary B. Simmons filed on even date herewith, the entire disclosure of which is hereby incorporated by reference. The aforementioned co-pending application is also assigned to Hunter Industries, Inc. The bi-level shift sun gear 48 has a neutral position between the planet gear 54 and the idler gear 56 in which it is not engaged with either of these two gears. This precludes any possibility that the bi-level sun gear 48 will strip either or both of the gears 54 and 56. The bi-level shift sun gear 48 always rotates as a result of the upstream rotating gears that are driven by the turbine 28. If the gear teeth of the bi-level shift sun gear 48 do not immediately engage with the gears 54 and 56 during shifting, the teeth will align within one tooth of rotation. The bi-level shift sun gear 48 is spring biased both upwardly and downwardly from this neutral position by an over-center spring mechanism inside the additional reversing mechanism 13. This ensures that the planetary gear drive 12 will be in one of two driving states, either rotating the nozzle 14 clockwise or counter-clockwise.

Thus the sprinkler 10 uses the planetary gear drive 12 and the additional reversing mechanism 13 to change the direction of rotation of the nozzle turret 26. The overall reversing mechanism of the sprinkler 10 has two portions, namely, the components of the reversing mechanism 13 that are located external of the gear box housing 34, and another portion that is contained within the planetary gear drive 12 that includes the bi-level shifting sun gear 48, planetary gear 54, idler gear 56, and planetary gear 58. The advantage of including at least a portion of the overall reversing mechanism in the planetary gear drive 12 is that the shifting can be done in a low torque region of the planetary gear drive 12 where damage and wear to gears is much less likely to occur. This eliminates the need to use conventional arc-shaped shifting frames with delicate pinion gears that engage a bull ring gear assembly and bear large loads. The planetary gear drive 12 can deliver relatively high rotational torque to the nozzle turret 26 in a manner that is useful in large rotor-type sprinklers used to water golf courses and playing fields. Such high torque may prematurely wear out and/or strip conventional pivoting gear train reversing mechanisms. The different gear tooth profiles of the ring gears 50 and 51 and the upper and lower stages 48*a* and 48*b* of the bi-level shift sun gear 48 desirably result in the nozzle 14 rotating in both the clockwise and counter-clockwise directions at a substantially uniform predetermined speed of rotation.

While we have described and illustrated in detail an embodiment of a sprinkler with a reversing planetary gear drive, it should be understood that our invention can be modified in both arrangement and detail. For example the reversing planetary gear drive 12 could be configured to work with a bi-level ring gear and a shifting sun gear with a single profile, or a bi-level shifting sun gear and a ring gear with a single profile. The sprinkler 10 could be modified to a simplified shrub configuration without the valve 16, outer case 18, valve actuator components 19 and housing 20. Therefore the protection afforded our invention should only be limited in accordance with the following claims.

We claim:

1. A sprinkler, comprising:

a turbine;

a nozzle; and a planetary gear drive having an axis and a reversing mechanism rotatably coupling the turbine and the nozzle, the planetary gear drive including a shift sun gear capable of axially shifting between raised and lowered positions to alternately drive a non-axially shifting first planet gear that in turn drives a first ring gear and a non-axially shifting second planet gear that in turn drives a second ring gear through an idler gear, the first and second ring gears having different gear tooth profiles to thereby change a direction of rotation of the planetary gear drive and rotate the nozzle in clockwise and counter-clockwise directions at a substantially uniform predetermined speed of rotation.

2. The sprinkler of claim 1 and further comprising a riser enclosing the planetary gear drive, an outer case surrounding the riser, and a coil spring surrounding the riser and normally holding the riser in a retracted position within the case and compressible to allow the riser to telescope to an extended position when pressurized water is introduced into the case.

3. The sprinkler of claim 1 wherein the nozzle is carried inside a nozzle turret rotatably mounted to the upper end of the riser.

4. The sprinkler of claim 1 wherein the planetary gear drive includes a gear box housing and the first and second ring gears are formed on an interior wall of the gear box.

5. The sprinkler of claim 1 wherein the reversing mechanism includes a plurality of components mounted externally of the planetary gear drive that axially shift the shift sun gear.

6. The sprinkler of claim 5 wherein the shift sun gear is coupled to a lower end of a drive shaft and externally mounted components of the reversing mechanism control the position of the drive shaft.

7. The sprinkler of claim 1 wherein the shift sun gear is a bi-level shift sun gear with upper and lower stages having different gear profiles.

8. The sprinkler of claim 1 wherein the first and second ring gears have a different diameter.

9. The sprinkler of claim 5 wherein the externally mounted components of the reversing mechanism include at least one cam.

10. The sprinkler of claim 1 and further comprising mechanisms for allowing user adjustment of the size of an arc of oscillation of the nozzle.

11. A sprinkler, comprising:

a turbine;

a nozzle; and a planetary gear drive having an axis and a reversing mechanism rotatably coupling the turbine and the nozzle, the planetary gear drive including a bi-level shift sun gear with upper and lower stages having different gear profiles, the bi-level shift sun gear being capable of axially shifting between raised and lowered positions to alternately drive a non-axially shifting first planet gear that in turn drives a ring gear and a non-axially shifting second planet gear that in turn drives the ring gear through an idler gear to thereby change a direction of rotation of the planetary gear drive and rotate the nozzle in clockwise and counter-clockwise directions at a substantially uniform predetermined speed of rotation.

12. The sprinkler of claim 11 and further comprising a riser enclosing the planetary gear drive, an outer case surrounding the riser, and a coil spring surrounding the riser and normally holding the riser in a retracted position within the case and compressible to allow the riser to telescope to an extended position when pressurized water is introduced into the case.

13. The sprinkler of claim 11 wherein the nozzle is carried inside a nozzle turret rotatably mounted to the upper end of the riser.

14. The sprinkler of claim 11 wherein the ring gear is a bi-level ring gear that includes first and second ring stages with different diameters.

15. The sprinkler of claim 11 wherein the reversing mechanism includes a plurality of components mounted externally of the planetary gear drive that axially shift the bi-level shift sun gear.

16. The sprinkler of claim 15 wherein the bi-level shift sun gear is coupled to a lower end of a drive shaft and the externally mounted components of the reversing mechanism control the position of the drive shaft.

17. The sprinkler of claim 15 wherein the externally mounted components of the reversing mechanism include at least one cam.

18. The sprinkler of claim 11 and further comprising mechanisms for allowing user adjustment of the size of an arc of oscillation of the nozzle.

19. The sprinkler of claim 18 wherein the mechanisms for allowing user adjustment of the size of an arc of oscillation of the nozzle include a bull gear ring, an arc tab carrier ring and adjusting gear.

20. A sprinkler, comprising:

a turbine;

a nozzle;

a planetary gear drive having an axis and a reversing mechanism rotatably coupling the turbine and the nozzle, the planetary gear drive including a bi-level shift sun gear with upper and lower stages having different gear profiles, the bi-level shift sun gear being capable of axially shifting between raised and lowered positions to alternately drive a non-axially shifting first planet gear that in turn drives a first ring gear and a non-axially shifting second planet gear that in turn drives a second ring gear through an idler gear, the first and second ring gears having different gear tooth profiles to thereby change a direction of rotation of the planetary gear drive and rotate the nozzle in clockwise and counter-clockwise directions at a substantially uniform predetermined speed of rotation; and mechanisms for allowing user adjustment of the size of an arc of oscillation of the nozzle.

* * * * *